US012748606B2

(12) United States Patent
Young et al.

(10) Patent No.: US 12,748,606 B2
(45) Date of Patent: Sep. 29, 2026

(54) FRAMEWORK FOR CREATING USER INTERFACES

(71) Applicant: Apple Inc., Cupertino, CA (US)

(72) Inventors: Gregory S. Young, San Francisco, CA (US); Daniela B. Chootong, Sunnyvale, CA (US); Rudolf Hernandez, Philadelphia, PA (US); Dana J. Dubois, San Carlos, CA (US); Ross F. Lebeau, Brooklyn, NY (US)

(73) Assignee: Apple Inc., Cupertino, CA (US)

( * ) Notice: Subject to any disclaimer, the term of this patent is extended or adjusted under 35 U.S.C. 154(b) by 406 days.

(21) Appl. No.: 18/380,138

(22) Filed: Oct. 13, 2023

(65) Prior Publication Data

US 2024/0403074 A1 Dec. 5, 2024

Related U.S. Application Data

(60) Provisional application No. 63/470,824, filed on Jun. 2, 2023.

(51) Int. Cl.
*G06F 9/451* (2018.01)
*G06F 9/54* (2006.01)

(52) U.S. Cl.
CPC ................ *G06F 9/451* (2018.02); *G06F 9/54* (2013.01)

(58) Field of Classification Search
CPC .................................. G06F 9/451; G06F 9/54
See application file for complete search history.

(56) References Cited

U.S. PATENT DOCUMENTS

| | | | | | |
|---|---|---|---|---|---|
| 10,904,105 | B2 * | 1/2021 | Venkiteswaran | G06F 16/26 | |
| 11,039,225 | B2 * | 6/2021 | Damaggio | G16Y 40/30 | |
| 11,977,879 | B2 * | 5/2024 | Kattimani | G06F 8/71 | |
| 2004/0046789 | A1 * | 3/2004 | Inanoria | G06F 8/38 | 715/748 |
| 2007/0055932 | A1 * | 3/2007 | Glein | G06F 9/451 | 715/209 |
| 2011/0307405 | A1 * | 12/2011 | Hammer | G06Q 10/0831 | 705/331 |
| 2013/0297758 | A1 * | 11/2013 | Roshan | H04W 4/60 | 709/223 |
| 2016/0188183 | A1 * | 6/2016 | Soffer | G06F 3/04847 | 715/762 |

(Continued)

OTHER PUBLICATIONS

International Patent Application No. PCT/US2024/027242; Int'l Search Report and the Written Opinion; dated Jul. 31, 2024; 13 pages.

*Primary Examiner* — Tadesse Hailu
(74) *Attorney, Agent, or Firm* — BAKERHOSTETLER; Kyle B. Morse

(57) ABSTRACT

Some techniques are described herein for rendering and causing display of a user interface according to a declarative request. In such techniques, a framework executing in a process of an application receives a declarative request from the application and, in response, determines a visual configuration of user-interface elements for a user interface and renders the user interface based on the visual configuration. In some examples, the framework allows the application to minimize the amount of code needed for the user interface and instead rely on a library and/or code provided by an operating system of a computer system to provide the code to create and manage the user interface.

36 Claims, 8 Drawing Sheets

(56) References Cited

U.S. PATENT DOCUMENTS

| | | | | |
|---|---|---|---|---|
| 2018/0121026 | A1 | 5/2018 | Nadig et al. | |
| 2019/0370031 | A1* | 12/2019 | Xiao | G06F 16/9024 |
| 2020/0341619 | A1* | 10/2020 | Rogers | G06F 3/0482 |
| 2023/0039601 | A1* | 2/2023 | Kattimani | G06F 9/44505 |
| 2023/0107397 | A1* | 4/2023 | Umakandan | G06F 9/547 719/328 |
| 2024/0235855 | A1* | 7/2024 | Goodman | H04L 63/0823 |
| 2024/0256316 | A1* | 8/2024 | Chatterjee | G06F 9/45558 |
| 2025/0110754 | A1* | 4/2025 | Kozemirov | G06F 9/543 |

* cited by examiner

FRAMEWORK FOR CREATING USER INTERFACES

CROSS-REFERENCE TO RELATED APPLICATIONS

The present application claims benefit of U.S. Provisional Application Ser. No. 63/470,824, entitled "FRAMEWORK FOR CREATING USER INTERFACES" filed Jun. 2, 2023, which is hereby incorporated by reference in its entirety for all purposes.

BACKGROUND

Applications on electronic devices are becoming increasingly prevalent. Creating user interfaces for such applications can be difficult, particularly with user interfaces that are common across different applications and are expected by users to function similarly. Accordingly, there is a need to improve techniques for creating user interfaces.

SUMMARY

Current techniques for creating user interfaces are generally ineffective and/or inefficient. For example, some techniques require a developer to design and code the location, appearance, and functionality of every user-interface element in every user interface. Other techniques require a developer to rely on services provided off of devices displaying user interfaces to create the user interfaces. This disclosure provides more effective and/or efficient techniques for creating user interfaces using an example of a framework executing with an application to render and cause display of a user interface based on a declarative request. It should be recognized that other software architectures can be used with techniques described herein. For example, the framework can be executing outside of the application and/or any process of the application using techniques described herein. In addition, techniques optionally complement or replace other techniques for creating user interfaces.

Some techniques are described herein for rendering and causing display of a user interface according to a declarative request. In such techniques, a framework executing in a process of an application receives a declarative request from the application and, in response, determines a visual configuration of user-interface elements for a user interface and renders the user interface based on the visual configuration. In some examples, the framework allows the application to minimize the amount of code needed for the user interface and instead rely on a library and/or code provided by an operating system of a computer system to provide the code to create and manage the user interface. Some techniques described herein include a framework communicating with a daemon to obtain information for a user interface, allowing the framework to dynamically include different information in the user interface in different contexts without the application needing to be updated.

In some examples, a method is described that is performed by a framework executing in a process of an application on an electronic device. In some examples, the method comprises: receiving, from the application, a declarative request; in response to receiving the declarative request, determining, based on the declarative request: one or more user-interface elements; and a visual configuration of the one or more user-interface elements, wherein the visual configuration is not defined in the declarative request; based on the visual configuration, rendering a user interface including the one or more user-interface elements; and after rendering the user interface, causing the user interface to be displayed via a display of the electronic device.

In some examples, a non-transitory computer-readable storage medium is described storing one or more programs configured to be executed by one or more processors of an electronic device including a display. In some examples, the one or more programs includes instructions for: receiving, from an application of the one or more programs, a declarative request; in response to receiving the declarative request, determining, based on the declarative request: one or more user-interface elements; and a visual configuration of the one or more user-interface elements, wherein the visual configuration is not defined in the declarative request; based on the visual configuration, rendering a user interface including the one or more user-interface elements; and after rendering the user interface, causing the user interface to be displayed via the display.

In some examples, a transitory computer-readable storage medium is described storing one or more programs configured to be executed by one or more processors of an electronic device including a display. In some examples, the one or more programs includes instructions for: receiving, from an application of the one or more programs, a declarative request; in response to receiving the declarative request, determining, based on the declarative request: one or more user-interface elements; and a visual configuration of the one or more user-interface elements, wherein the visual configuration is not defined in the declarative request; based on the visual configuration, rendering a user interface including the one or more user-interface elements; and after rendering the user interface, causing the user interface to be displayed via the display.

In some examples, an electronic device is described. In some examples, the electronic device comprises a display, one or more processors, and memory storing one or more programs configured to be executed by the one or more processors. In some examples, the one or more programs includes instructions for: receiving, from an application of the one or more programs, a declarative request; in response to receiving the declarative request, determining, based on the declarative request: one or more user-interface elements; and a visual configuration of the one or more user-interface elements, wherein the visual configuration is not defined in the declarative request; based on the visual configuration, rendering a user interface including the one or more user-interface elements; and after rendering the user interface, causing the user interface to be displayed via the display.

In some examples, an electronic device is described. In some examples, the electronic device comprises a display and means for performing each of the following steps: receiving, from an application executing on the electronic device, a declarative request; in response to receiving the declarative request, determining, based on the declarative request: one or more user-interface elements; and a visual configuration of the one or more user-interface elements, wherein the visual configuration is not defined in the declarative request; based on the visual configuration, rendering a user interface including the one or more user-interface elements; and after rendering the user interface, causing the user interface to be displayed via the display.

In some examples, a computer program product is described. In some examples, the computer program product comprises one or more programs configured to be executed by one or more processors of an electronic device. In some examples, the one or more programs include instructions for: receiving, from an application of the electronic device, a declarative request; in response to receiving the declarative request, determining, based on the declarative request: one or more user-interface elements; and a visual configuration of the one or more user-interface elements, wherein the visual configuration is not defined in the declarative request; based on the visual configuration, rendering a user interface including the one or more user-interface elements; and after rendering the user interface, causing the user interface to be displayed via a display of the electronic device.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

DESCRIPTION OF THE FIGURES

For a better understanding of the various described examples, reference should be made to the Detailed Description below, in conjunction with the following drawings in which like reference numerals refer to corresponding parts throughout the figures.

DETAILED DESCRIPTION

Figure 1:
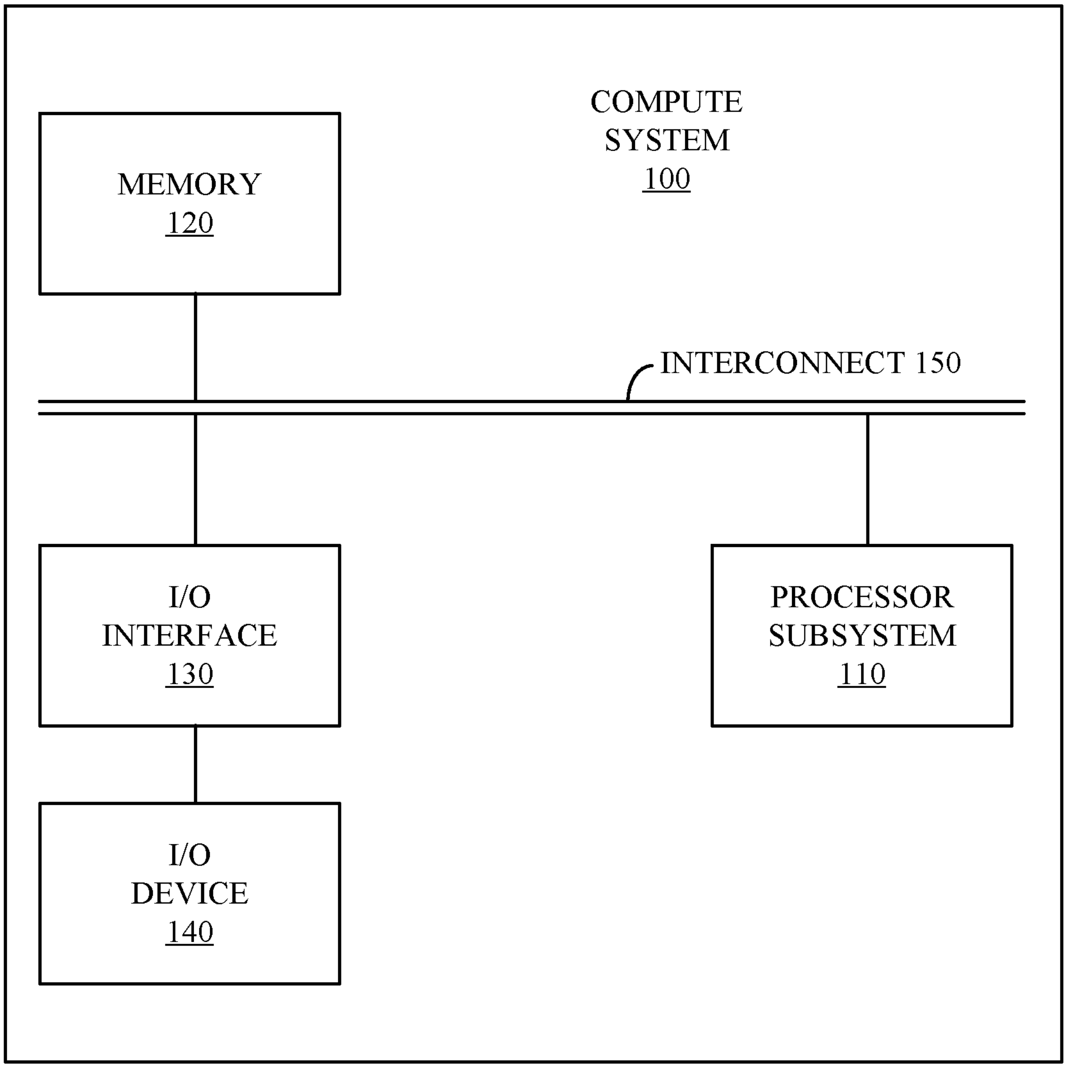
FIG. 1 is a block diagram illustrating a compute system in accordance with some examples.

The following description sets forth exemplary methods, parameters, and the like. It should be recognized, however, that such description is not intended as a limitation on the scope of the present disclosure but is instead provided as a description of exemplary examples.

Methods and/or processes described herein can include one or more steps that are contingent upon one or more conditions being satisfied. It should be understood that a method can occur over multiple iterations of the same process with different steps of the method being satisfied in different iterations. For example, if a method requires performing a first step upon a determination that a set of one or more criteria is met and a second step upon a determination that the set of one or more criteria is not met, a person of ordinary skill in the art would appreciate that the steps of the method are repeated until both conditions, in no particular order, are satisfied. Thus, a method described with steps that are contingent upon a condition being satisfied can be rewritten as a method that is repeated until each of the conditions described in the method are satisfied. This, however, is not required of system or computer readable medium claims where the system or computer readable medium claims include instructions for performing one or more steps that are contingent upon one or more conditions being satisfied. Because the instructions for the system or computer readable medium claims are stored in one or more processors and/or at one or more memory locations, the system or computer readable medium claims include logic that can determine whether the one or more conditions have been satisfied without explicitly repeating steps of a method until all of the conditions upon which steps in the method are contingent have been satisfied. A person having ordinary skill in the art would also understand that, similar to a method with contingent steps, a system or computer readable storage medium can repeat the steps of a method as many times as needed to ensure that all of the contingent steps have been performed.

Although the following description uses terms "first," "second," etc. to describe various elements, these elements should not be limited by the terms. In some examples, these terms are used to distinguish one element from another. For example, a first subsystem could be termed a second subsystem, and, similarly, a subsystem device could be termed a subsystem device, without departing from the scope of the various described examples. In some examples, the first subsystem and the second subsystem are two separate references to the same subsystem. In some examples, the first subsystem and the second subsystem are both subsystem, but they are not the same subsystem or the same type of subsystem.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when," "upon," "in response to determining," "in response to detecting," or "in accordance with a determination that" depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," or "in accordance with a determination that [the stated condition or event]" depending on the context.

Turning to FIG. 1, a block diagram of compute system 100 is illustrated. Compute system 100 is a non-limiting example of a compute system that can be used to perform functionality described herein. It should be recognized that other computer architectures of a compute system can be used to perform functionality described herein.

In the illustrated example, compute system 100 includes processor subsystem 110 communicating with (e.g., wired or wirelessly) memory 120 (e.g., a system memory) and I/O interface 130 via interconnect 150 (e.g., a system bus, one or more memory locations, or other communication channel for connecting multiple components of compute system 100). In addition, I/O interface 130 is communicating with (e.g., wired or wirelessly) to I/O device 140. In some examples, I/O interface 130 is included with I/O device 140 such that the two are a single component. It should be recognized that there can be one or more I/O interfaces, with each I/O interface communicating with one or more I/O devices. In some examples, multiple instances of processor subsystem 110 can be communicating via interconnect 150.

Compute system 100 can be any of various types of devices, including, but not limited to, a system on a chip, a server system, a personal computer system (e.g., a smartphone, a smartwatch, a wearable device, a tablet, a laptop computer, and/or a desktop computer), a sensor, or the like. In some examples, compute system 100 is included or communicating with a physical component for the purpose of modifying the physical component in response to an instruction. In some examples, compute system 100 receives an instruction to modify a physical component and, in response to the instruction, causes the physical component to be modified. In some examples, the physical component is modified via an actuator, an electric signal, and/or algorithm. Examples of such physical components include an acceleration control, a break, a gear box, a hinge, a motor, a pump, a refrigeration system, a spring, a suspension system, a steering control, a pump, a vacuum system, and/or a valve. In some examples, a sensor includes one or more hardware components that detect information about a physical environment in proximity to (e.g., surrounding) the sensor. In some examples, a hardware component of a sensor includes a sensing component (e.g., an image sensor or temperature sensor), a transmitting component (e.g., a laser or radio transmitter), a receiving component (e.g., a laser or radio receiver), or any combination thereof. Examples of sensors include an angle sensor, a chemical sensor, a brake pressure sensor, a contact sensor, a non-contact sensor, an electrical sensor, a flow sensor, a force sensor, a gas sensor, a humidity sensor, an image sensor (e.g., a camera sensor, a radar sensor, and/or a LiDAR sensor), an inertial measurement unit, a leak sensor, a level sensor, a light detection and ranging system, a metal sensor, a motion sensor, a particle sensor, a photoelectric sensor, a position sensor (e.g., a global positioning system), a precipitation sensor, a pressure sensor, a proximity sensor, a radio detection and ranging system, a radiation sensor, a speed sensor (e.g., measures the speed of an object), a temperature sensor, a time-of-flight sensor, a torque sensor, and an ultrasonic sensor. In some examples, a sensor includes a combination of multiple sensors. In some examples, sensor data is captured by fusing data from one sensor with data from one or more other sensors. Although a single compute system is shown in FIG. 1, compute system 100 can also be implemented as two or more compute systems operating together.

In some examples, processor subsystem 110 includes one or more processors or processing units configured to execute program instructions to perform functionality described herein. For example, processor subsystem 110 can execute an operating system, a middleware system, one or more applications, or any combination thereof.

In some examples, the operating system manages resources of compute system 100. Examples of types of operating systems covered herein include batch operating systems (e.g., Multiple Virtual Storage (MVS)), time-sharing operating systems (e.g., Unix), distributed operating systems (e.g., Advanced Interactive executive (AIX), network operating systems (e.g., Microsoft Windows Server), and real-time operating systems (e.g., QNX). In some examples, the operating system includes various procedures, sets of instructions, software components, and/or drivers for controlling and managing general system tasks (e.g., memory management, storage device control, power management, or the like) and for facilitating communication between various hardware and software components. In some examples, the operating system uses a priority-based scheduler that assigns a priority to different tasks that processor subsystem 110 can execute. In such examples, the priority assigned to a task is used to identify a next task to execute. In some examples, the priority-based scheduler identifies a next task to execute when a previous task finishes executing. In some examples, the highest priority task runs to completion unless another higher priority task is made ready.

In some examples, the middleware system provides one or more services and/or capabilities to applications (e.g., the one or more applications running on processor subsystem 110) outside of what the operating system offers (e.g., data management, application services, messaging, authentication, API management, or the like). In some examples, the middleware system is designed for a heterogeneous computer cluster to provide hardware abstraction, low-level device control, implementation of commonly used functionality, message-passing between processes, package management, or any combination thereof. Examples of middleware systems include Lightweight Communications and Marshalling (LCM), PX4, Robot Operating System (ROS), and ZeroMQ. In some examples, the middleware system represents processes and/or operations using a graph architecture, where processing takes place in nodes that can receive, post, and multiplex sensor data messages, control messages, state messages, planning messages, actuator messages, and other messages. In such examples, the graph architecture can define an application (e.g., an application executing on processor subsystem 110 as described above) such that different operations of the application are included with different nodes in the graph architecture.

In some examples, a message sent from a first node in a graph architecture to a second node in the graph architecture is performed using a publish-subscribe model, where the first node publishes data on a channel in which the second node can subscribe. In such examples, the first node can store data in memory (e.g., memory 120 or some local memory of processor subsystem 110) and notify the second node that the data has been stored in the memory. In some examples, the first node notifies the second node that the data has been stored in the memory by sending a pointer (e.g., a memory pointer, such as an identification of a memory location) to the second node so that the second node can access the data from where the first node stored the data. In some examples, the first node would send the data directly to the second node so that the second node would not need to access a memory based on data received from the first node.

Memory 120 can include a computer readable medium (e.g., non-transitory or transitory computer readable medium) usable to store (e.g., configured to store, assigned to store, and/or that stores) program instructions executable by processor subsystem 110 to cause compute system 100 to perform various operations described herein. For example, memory 120 can store program instructions to implement the functionality associated with methods 600 (FIG. 6) described below.

Memory 120 can be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, or the like), read only memory (PROM, EEPROM, or the like), or the like. Memory in compute system 100 is not limited to primary storage such as memory 120. Compute system 100 can also include other forms of storage such as cache memory in processor subsystem 110 and secondary storage on I/O device 140 (e.g., a hard drive, storage array, etc.). In some examples, these other forms of storage can also store program instructions executable by processor subsystem 110 to perform operations described herein. In some examples, processor subsystem 110 (or each processor within processor subsystem 110) contains a cache or other form of on-board memory.

I/O interface 130 can be any of various types of interfaces configured to communicate with other devices. In some examples, I/O interface 130 includes a bridge chip (e.g., Southbridge) from a front-side bus to one or more back-side buses. I/O interface 130 can communicate with one or more I/O devices (e.g., I/O device 140) via one or more corresponding buses or other interfaces. Examples of I/O devices include storage devices (hard drive, optical drive, removable flash drive, storage array, SAN, or their associated controller), network interface devices (e.g., to a local or wide-area network), sensor devices (e.g., camera, radar, LiDAR, ultrasonic sensor, GPS, inertial measurement device, or the like), and auditory or visual output devices (e.g., speaker, light, screen, projector, or the like). In some examples, compute system 100 is communicating with a network via a network interface device (e.g., configured to communicate over Wi-Fi, Bluetooth, Ethernet, or the like). In some examples, compute system 100 is directly wired to the network.

Figure 2:
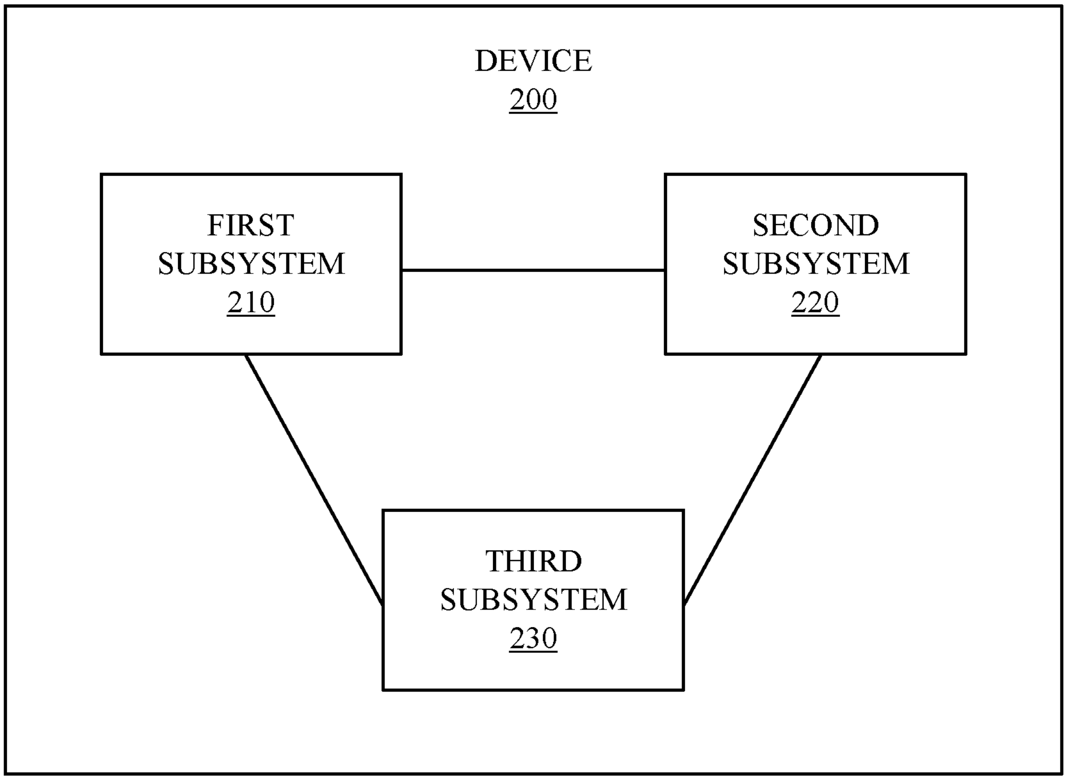
FIG. 2 is a block diagram illustrating a device with interconnected subsystems in accordance with some examples.

FIG. 2 illustrates a block diagram of device 200 with interconnected subsystems in accordance with some examples. In the illustrated example, device 200 includes three different subsystems (i.e., first subsystem 210, second subsystem 220, and third subsystem 230) communicating with (e.g., wired or wirelessly) each other, creating a network (e.g., a personal area network, a local area network, a wireless local area network, a metropolitan area network, a wide area network, a storage area network, a virtual private network, an enterprise internal private network, a campus area network, a system area network, and/or a controller area network). An example of a possible computer architecture of a subsystem as included in FIG. 2 is described in FIG. 1 (i.e., compute system 100). Although three subsystems are shown in FIG. 2, device 200 can include more or fewer subsystems.

In some examples, some subsystems are not connected to other subsystem (e.g., first subsystem 210 can be connected to second subsystem 220 and third subsystem 230 but second subsystem 220 cannot be connected to third subsystem 230). In some examples, some subsystems are connected via one or more wires while other subsystems are wirelessly connected. In some examples, messages are set between the first subsystem 210, second subsystem 220, and third subsystem 230, such that when a respective subsystem sends a message the other subsystems receive the message (e.g., via a wire and/or a bus). In some examples, one or more subsystems are wirelessly connected to one or more compute systems outside of device 200, such as a server system. In such examples, the subsystem can be configured to communicate wirelessly to the one or more compute systems outside of device 200.

In some examples, device 200 includes a housing that fully or partially encloses subsystems 210-230. Examples of device 200 include a home-appliance device (e.g., a refrigerator or an air conditioning system), a robot (e.g., a robotic arm or a robotic vacuum), and a vehicle. In some examples, device 200 is configured to navigate (with or without user input) in a physical environment.

In some examples, one or more subsystems of device 200 are used to control, manage, and/or receive data from one or more other subsystems of device 200 and/or one or more compute systems remote from device 200. For example, first subsystem 210 and second subsystem 220 can each be a camera that captures images, and third subsystem 230 can use the captured images for decision making. In some examples, at least a portion of device 200 functions as a distributed compute system. For example, a task can be split into different portions, where a first portion is executed by first subsystem 210 and a second portion is executed by second subsystem 220.

As used herein, an "installed application" refers to a software application that has been downloaded onto a computer system (e.g., compute system 100 and/or device 200) and is ready to be launched (e.g., become opened) on the device. In some examples, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of a system/global internal state and/or an application internal state). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards techniques for creating user interfaces. Such techniques are described in the context of an in-app purchase using an application and a local framework (e.g., code and/or a set of one or more operations that are, in some examples, agnostic to the application and/or developed separate from the application). It should be recognized that other contexts can be used with techniques described herein. For example, other types of user interfaces including a main menu, a login screen, and/or date picker can use techniques described herein. In addition, techniques optionally complement or replace other techniques for creating user interfaces.

Figure 3:
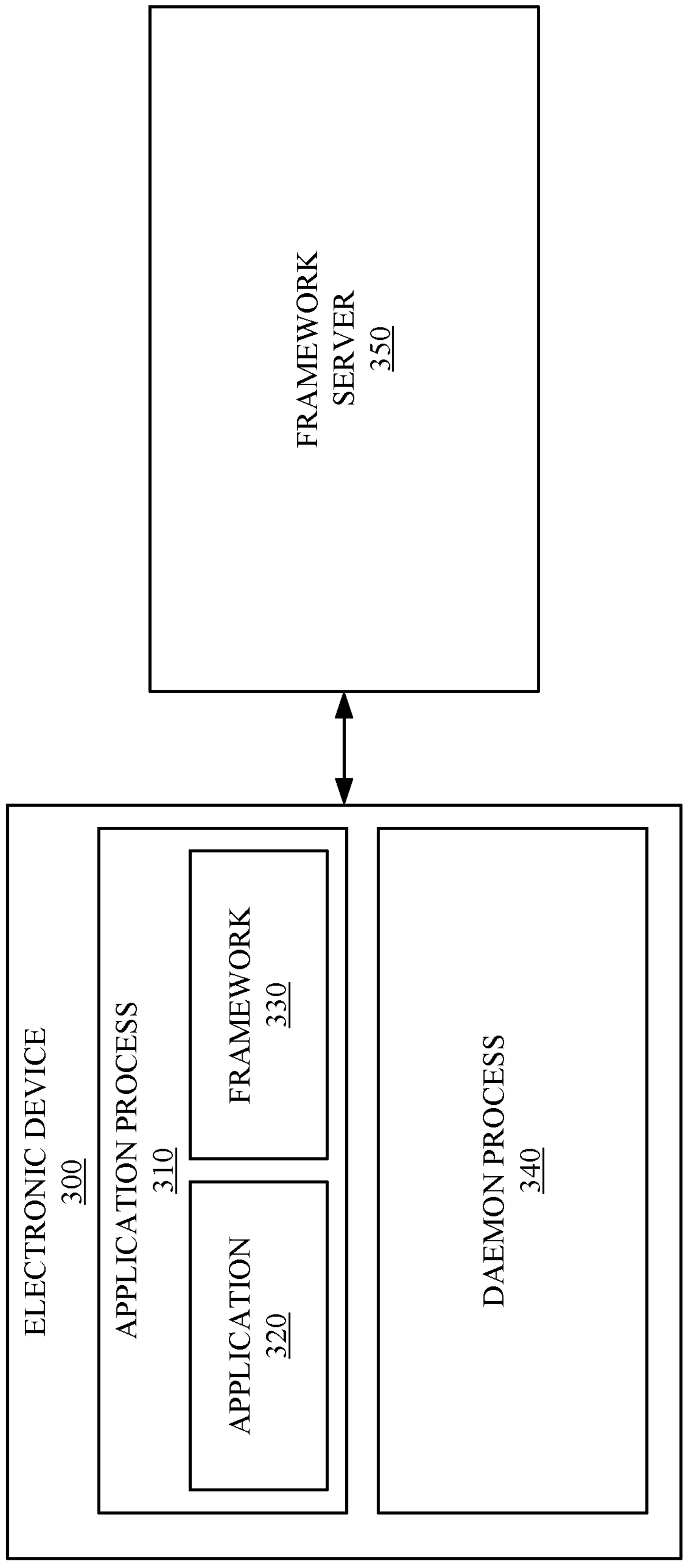
FIG. 3 is a block diagram illustrating an electronic device communicating with a framework server in accordance with some examples.

FIG. 3 is a block diagram illustrating an electronic device (e.g., electronic device 300) communicating with a framework server (e.g., framework server 350) in accordance with some examples. Electronic device 300 is a non-limiting example of an electronic device that can be used to perform functionality described herein. It should be recognized that electronic device 300 can include more, different, and/or fewer components than illustrated in FIG. 3. For example, electronic device 300 can include one or more components described above with respect to device 200 and/or compute system 100.

As illustrated in FIG. 3, electronic device 300 includes application process 310. In some examples, application process 310 corresponds to an application that is executing on electronic device 300, such as a user application, an application built into software installed on electronic device 300, and/or an application installed on electronic device 300 while electronic device 300 is running. Examples of the application include a music application for navigating to different songs and/or playing back such songs, a shopping application for navigating to different products and/or purchasing such products, and/or a streaming application for navigating to different streaming content (e.g., television shows, movies, songs, and/or podcasts) and/or playing such content. It should be recognized that other applications are within the scope of this disclosure and are omitted for brevity. In some examples, application process 310 includes one or more programs executing concurrently or serially. For example, FIG. 3 illustrates that application process 310 includes application 320 and framework 330. In some examples, application 320 corresponds to the application described above and relates to code provided by a developer and executing on electronic device 300.

In some examples, application 320 includes one or more calls and/or operations (e.g., in the form of a dynamic-link library and/or an operation to retrieve data from a computer system remote and/or separate from electronic device 300) that cause one or more other programs to execute with (e.g., in parallel with, concurrently with, and/or serially with) application 320 (and/or in application process 310). For example, application 320 can include code to download and/or execute framework 330. In such an example, framework 330 can be retrieved from a system process of an operating system of electronic device 300 and/or a location of electronic device 300 that is outside of application 320 and/or application process 310. In some examples, framework 330 is configured to perform one or more parts of functionality of application 320, such as rendering and/or displaying a user interface on behalf of application 320 as discussed further below. In some examples, the calls and/or operations of application 320 related to framework 330 are device-agnostic, such that the same calls and/or operations are performed regardless of what type of device they are used on. In such examples, different programs (e.g., frameworks) can be downloaded using the same calls and/or operations for different types of devices because the calls and/or operations are directed to processes of and/or locations on an electronic device (e.g., translation and/or response of the one or more calls and/or operations cause different forms of framework 330 to be downloaded, installed, and/or executed with application 320). In some examples, framework 330 can be customized and/or different for different devices and/or types of devices.

As illustrated in FIG. 3, electronic device 300 includes daemon process 340. In some examples, daemon process 340 is a background process of electronic device 300. In such examples, daemon process 340 can correspond to and/or be executed by an operating system of electronic device 300. In some examples, daemon process 340 corresponds to and/or communicates with framework 330. In such examples, downloading, obtaining, and/or executing framework 330 as discussed above can be performed through daemon process 340. In other examples, framework 330 is downloaded, obtained, and/or executed without regard to daemon process 340. In some examples, daemon process 340 communicates with framework server 350, such as on behalf of framework 330 and/or application 320. For example, daemon process 340 can retrieve information, data, and/or user-interface elements from framework server 350 to be used by framework 330 and/or application 320. In some examples, a developer corresponding to application 320 provides at least a portion of such information, data, and/or user-interface elements to framework server 350 so that framework server 350 can provide such elements to daemon process 340 in response to a request. In such examples, content in framework server 350 can be updated to change how application 320, framework 330, and/or daemon process 340 operates without needing to change any code with respect to application 320, framework 330, and/or daemon process 340.

It should be recognized that application 320, framework 330, and/or daemon process 340 can communicate with framework server 350 and/or other computer systems (e.g., other electronic devices and/or other servers) than illustrated in FIG. 3. For example, framework 330 can communicate with a server (e.g., an application server and/or a server corresponding to application 320 that is different from framework server 350) to perform a buy operation of an in-app purchase being handled by framework 330 on behalf of application 320, as discussed further below.

In some examples, communications between application 320 and framework 330 are via one or more application programming interfaces (APIs). In some examples, communications between (1) application 320 and/or framework 330 and (2) daemon process 340 are via one or more inter-process communications (e.g., IPCs). In other examples, communications between application 320, framework 330, and daemon process 340 are via APIs.

Figure 4:
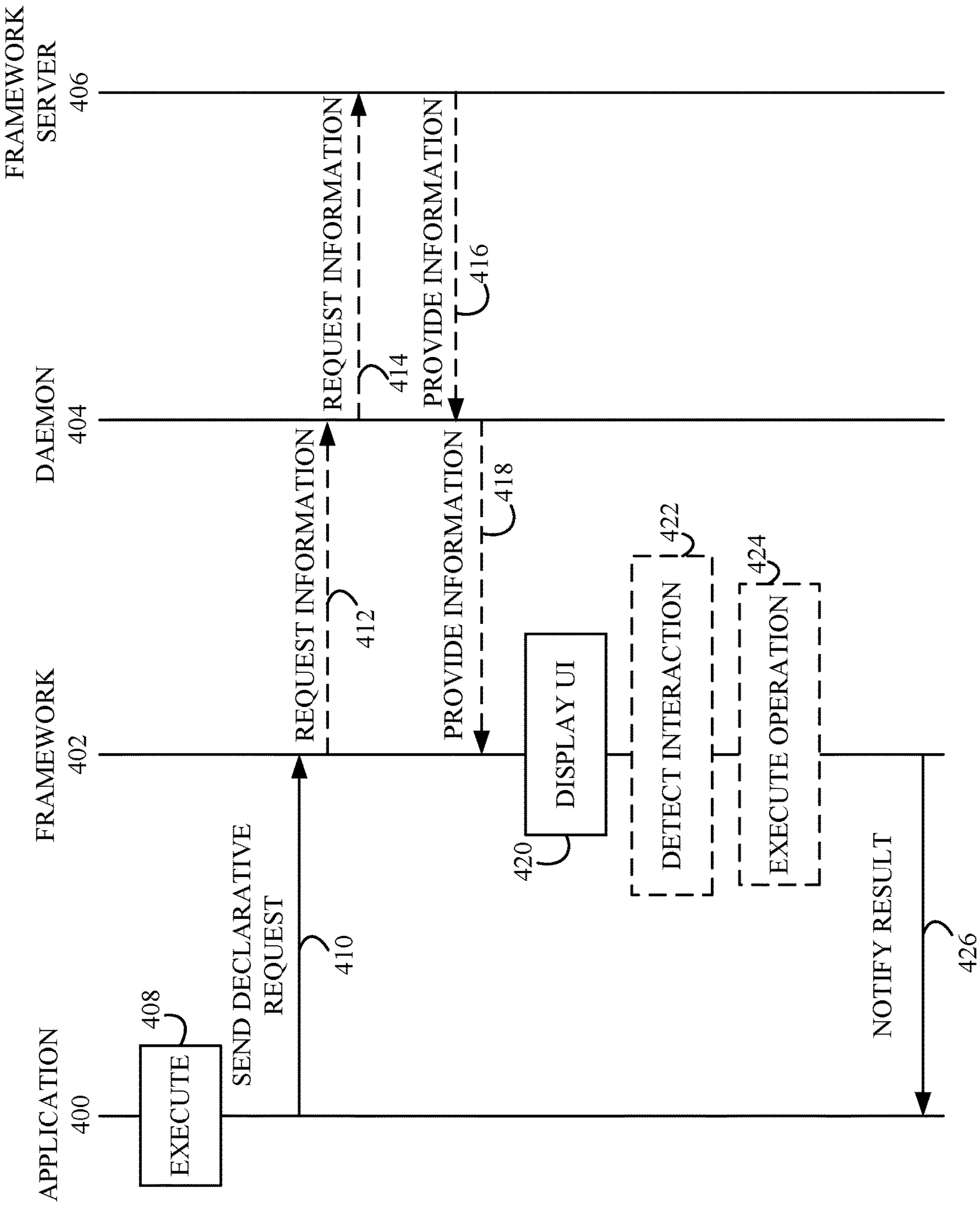
FIG. 4 is a swim-lane diagram illustrating a process to create and manage a user interface in accordance with some examples.

FIG. 4 is a swim-lane diagram illustrating a process to create and manage a user interface in accordance with some examples. As illustrated in FIG. 4, the process includes application 400, framework 402, daemon 404, and framework server 406 performing operations. It should be recognized that different and/or other components can perform one or more operations of the process than illustrated in FIG. 4.

In some examples, application 400 includes one or more components and/or functionality of application 320 described above with respect to FIG. 3, framework 402 includes one or more components and/or functionality of framework 330 described above with respect to FIG. 3, daemon 404 includes one or more components and/or functionality of daemon process 340 described above with respect to FIG. 3, and/or framework server 406 includes one or more components and/or functionality of framework server 350 described above with respect to FIG. 3.

At 408, application 400 begins executing on an electronic device (e.g., electronic device 300 of FIG. 3). In some examples, such execution is performed in response to input detected via an input device in communication with and/or included in the electronic device. For example, the electronic device can detect a tap input on an icon of application 400, causing application 400 to execute. In some examples, application 400 displays and/or manages interactions with one or more user interfaces corresponding to application 400. For example, application 400 can define what user-interface elements to include, how such user-interface elements should look, and/or a visual configuration of user-interface elements for different user interfaces.

In some examples, during execution of application 400 (e.g., before, while, or after application 400 displays a user interface), application 400 calls and/or performs an operation to download framework 402 from an operating system of the electronic device (e.g., as described above with respect to FIG. 3). In some examples, once executing in the same process as application 400, framework 402 performs one or more operations on behalf of and/or in response to a request from application 400. For example, before, after, and/or while displaying a respective user interface of application 400, application 400 can send a declarative request to framework 402 to perform an operation, as further discussed below.

At 410, application 400 sends a declarative request to framework 402. In some examples, the declarative request is sent in response to the electronic device and/or application 400 detecting an input corresponding to a request to display a user interface and/or user-interface element corresponding to and/or managed by framework 402. For example, framework 402 can correspond to user interfaces and/or user-interface elements related to in-app purchases for application 400 such that when a user interface related to in-app purchases is to be displayed, application 400 requests that the user interface and/or a user-interface element be included in the user interface is rendered and/or displayed through framework 402 via a respective declarative request.

In some examples, the declarative request includes indications of objects registered with framework 402 and/or framework server 406. For example, application 400 can be associated with one or more objects (e.g., products, services, and/or subscriptions) that are registered with framework 402 and/or framework server 406. In such an example, the declarative request can include (1) an indication of an object and/or a group of objects and/or (2) a separate indication of each of multiple objects. In examples with an indication of a group of objects, framework 402 can identify one or more objects corresponding to the indication by itself or via daemon 404 (e.g., querying framework service 406 as further discussed below). Providing an indication of a group allows application 400 and/or a developer associated with application 400 to dynamically update the group through framework server 406 without needing to update code of application 400 and/or framework 402. In some examples, an indication of an object includes a text, a size, a shape, a color (and/or color combination), orientation, and/or location of a user-interface element to be rendered for the object. In some examples, an indication of an object includes media (e.g., an icon, an image, a video, and/or an audio), an identification of the media, and/or a pointer to the media to be used when rendering user-interface element corresponding to the object. In some examples, the declarative request does not include an identification of media for an object and instead relies on framework 402 reaching out to daemon 404 to obtain the media. In some examples, the declarative request includes an order of objects and/or user-interface elements. In such examples, the order can be used when rendering a user-interface and/or set of user-interface elements.

At 412, framework 402 optionally requests information from daemon 404 (e.g., via an IPC or API). In some examples, the information is requested in response to framework 420 receiving the declarative request and/or determining that a user interface and/or user-interface element requires additional information not known by framework 402. In such examples, a request sent to daemon 404 as part of 412 includes identification of the information required. For example, the declarative request received at 410 can identify a set of multiple subscriptions to include in a user interface without any (and/or most) information related to whether a user of application 400 has already subscribed to a subscription in the set of multiple subscriptions. In such an example, framework 402 can send a request to daemon 404 for information related to the user with respect to the set of multiple subscriptions to determine whether the user interface to be rendered by framework 402 should include an indication that a subscription in the set of multiple subscriptions has already been subscribed to by the user.

At 414, daemon 404 optionally requests a first portion of the information from framework server 406. In some examples, daemon 404 caches a portion of information previously requested by framework 402 until a set of one or more delete criteria is satisfied (e.g., the portion of information previously requested has been stored for a predefined period of time (such as 1-10 days), an amount of information cached by daemon 404 exceeds a predefined amount (e.g., 1 MB-1 GB), and/or the electronic device requires additional memory). In such examples, when daemon 404 is currently caching a second portion of the information requested by framework 402, daemon sends the second portion to framework 402 at 418 without requesting the second portion of information from framework server 406. At 416, when framework server 406 receives a request for information from daemon 404, framework server 406 provides the information to daemon 404 to be provided to framework 402 at 418.

After framework 402 has information needed to render a user interface and/or a user-interface element, framework 402 renders the user interface and/or the user-interface element. Such information can include the information mentioned above with respect to 412 and 418 and/or other information determined based on the declarative request. For example, the declarative request can include a list of objects and framework 402 can render a user interface with a different user-interface element (e.g., a button and/or a checkbox) for each object in the list of objects in an orientation that fits a display area of the electronic device. In some examples, the different user-interface elements and/or the orientation is not defined in the declarative request and instead framework 402 determines such based on a set of rules and/or heuristics included in framework 402 for the electronic device.

In some examples, with rendering the user interface and/or the user-interface element, framework 402 adds call backs and/or other operations to occur when interactions occur with different user-interface elements, such operations not defined and/or directly requested by the declarative request. In other words, framework 402 can customize the look, feel, and/or interactions corresponding to a user-interface element rendered by framework 402, even when the look, feel, and/or interactions were not defined in the declarative request.

In some examples, framework 402 determines different user-interface elements to render for an object in different contexts. For example, when rendering a single user-interface element for a single object, framework 402 can determine to render the user-interface element as a button. As a comparison, when rendering multiple user-interface element, each for a different object, framework 402 can determine to render each of the multiple user-interface elements as a checkbox or a button depending on whether one or more than one of the user-interface elements should be able to be selected at one time. In some examples, framework 402 determines a background of a user interface and/or what part of the user interface should include the background, even without the declarative request defining such. For example, framework 402 can determine to include an unblurred background in one portion of a user interface without user-interface elements and a blurred background in another portion of the user interface with user-interface elements (e.g., to create more contrast with the user-interface element than would be with the unblurred background). In some examples, framework 402 determines that a request in the declarative request does not confirm to one or more criteria for the electronic device. In such examples, framework 402 can render a different user-interface element (e.g., a different size and/or color) then requested in the declarative request so to satisfy the one or more criteria for the electronic device.

At 420, framework 402 causes display of a user interface and/or a user-interface element rendered by framework 402. In some examples, when the declarative request corresponds to an entire user interface, framework 402 causes display of the entire user interface, such as directly displaying, displaying via application 400, and/or displaying via a system process of the electronic device. In other examples, when the declarative request corresponds to a user-interface element (e.g., and not an entire user interface), framework 402 causes display of the user-interface element, such as via application 400, the electronic device, and/or a system process of the electronic device for displaying content. In such examples, the user-interface element can be included in a user interface of application 400 and/or a system user interface that is displayed by a system process of the electronic device.

At 422, framework 402 optionally detects an interaction with a user-interface displayed and/or managed by framework 402. At 424, framework 402 optionally executes an operation as a result of the interaction. For example, the interaction can correspond to a button for purchasing a product. In such an example, framework 402 executes an operation to purchase the product without needing to communicate with application 400. In some examples, after executing an operation that fails, framework 402 changes display of a user interface and/or a user-interface element corresponding to the operation that fails such that the user interface and/or the user-interface element indicates failure of the operation. Such changes can occur without communicating with application 400 to determine how to respond.

At 426, framework 402 notifies application 400 of a result, such as a result of displaying the user interface and/or the user-interface element at 420, detecting the interaction, and/or executing the operation at 424. For example, the result can include a request to display the user interface and/or the user-interface element. For another example, the result can include that the user interface and/or the user-interface element was successfully or unsuccessfully displayed. For another example, the result can include that the interaction occurred, the operation was executed, and/or a result of the operation executing (such as that a particular product and/or subscription was purchased).

FIGS. 5A-5E are examples of user interfaces rendered and displayed in accordance with some examples. The description to follow will provide some examples of different components described herein and how they relate to the exemplary user interfaces. For ease of discussion, each of the user interfaces of FIGS. 5A-5E are displayed by electronic device 500. Electronic device 500 is a non-limiting example of an electronic device that can be used to display such user interfaces. For example, electronic device 500 can include one or more components described above with respect to the electronic device of FIG. 4, electronic device 300, device 200, and/or compute system 100. It should be recognized that electronic device 500 can be a different form factor and/or can display different user interfaces than illustrated in FIGS. 5A-5E.

Figure 5A:
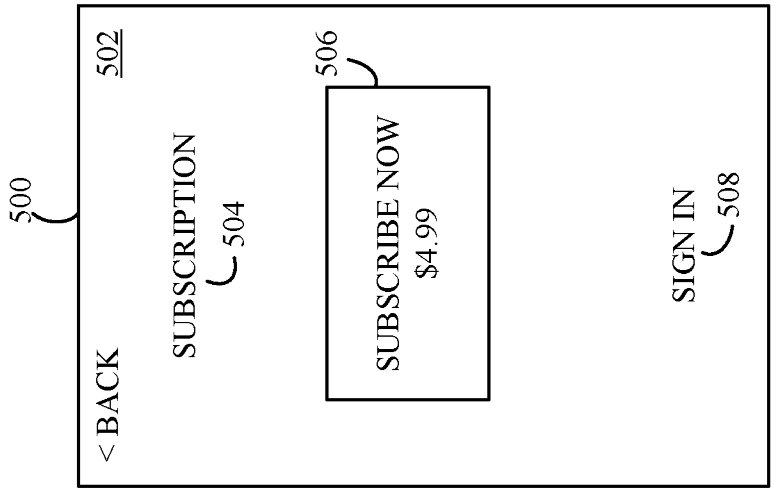
FIGS. 5A-5E are examples of user interfaces rendered and displayed in accordance with some examples.

FIG. 5A is a block diagram illustrating a subscription user interface (e.g., subscription user interface 502) displayed via an electronic device (e.g., electronic device 500). In some examples, subscription user interface 502 is displayed in response to electronic device 500 detecting input directed to a user-interface element displayed in a user interface of an application (e.g., the user interface was rendered and/or displayed by the application). In such examples, subscription user interface 502 can be caused to be displayed by a framework executing in a process of the application.

In some examples, the framework causes subscription user interface 502 to be displayed in response to receiving a declarative request by the application that includes an identification of a subscription (e.g., the subscription corresponding to the subscription listed by subscription text 504). In such examples, the declarative request might not identify particular details (e.g., or, in some examples, any or most details) about virtual button 506 but instead the framework (1) obtains a price (e.g., $4.99) from a daemon executing on electronic device 500, (2) identifies that a user is not currently signed into the application via the daemon (and/or the declarative request or a communication with the application), and/or (3) determines what text, font, font size, size and/or shape of virtual button 506, and/or color to include in subscription user interface 502 (e.g., directly or via the daemon). In some examples, the framework configures virtual button 506 to, when selected, initiate a process to purchase the subscription. In such examples, the framework can manage the process and, in some examples, not notify the application of selection of virtual button 506 and/or one or more steps occurring in the process to purchase the subscription. In some examples, the framework notifies the application that the subscription was successfully purchased after the process to purchase the subscription is completed. In some examples, the framework configures sign-in user-interface element 508 to, when selected, initiate a process to sign into the application that is managed by the framework instead of the application.

Figure 5B:
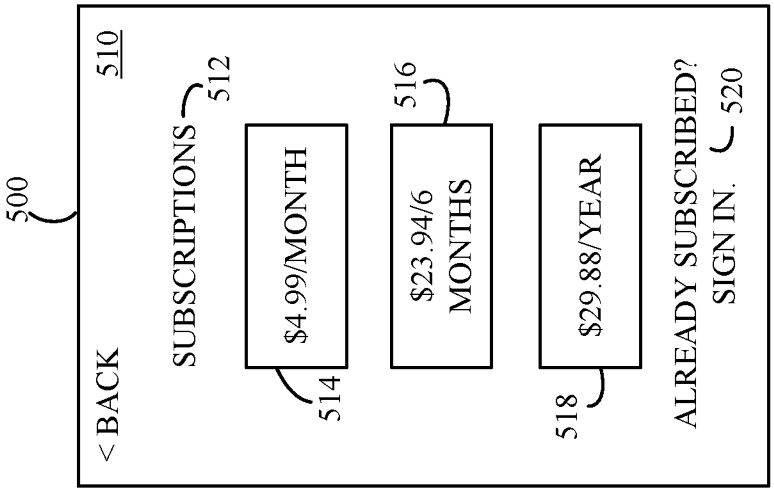

FIG. 5B is a block diagram illustrating a subscriptions user interface (e.g., subscriptions user interface 510) with virtual buttons (e.g., first virtual button 514, second virtual button 516, and third virtual button 518) displayed via an electronic device (e.g., electronic device 500). Similar to FIG. 5A, in some examples, subscriptions user interface 510 is displayed in response to electronic device 500 detecting input directed to a user-interface element displayed in a user interface of an application (e.g., the user interface was rendered and/or displayed by the application). In such examples, subscriptions user interface 510 can be caused to be displayed by the framework described with respect to FIG. 5A.

In some examples, the framework causes subscriptions user interface 510 to be displayed in response to receiving a declarative request by the application that includes an identification of a set of subscriptions (e.g., the set of subscriptions corresponding to each of first virtual button 514, second virtual button 516, and third virtual button 518). In such examples, the declarative request might not identify each subscription and/or particular details (e.g., or, in some examples, any or most details) about first virtual button 514, second virtual button 516, and third virtual button 518 but instead the framework (1) obtains an identification of each subscription from the daemon described with respect to FIG. 5A, (2) obtains a price (e.g., $4.99/month) for each subscription from the daemon, (3) identifies that a user is not currently signed into the application via the daemon (and/or the declarative request or a communication with the application), and/or (4) determines what text, font, font size, size, shape, and/or relative orientation of first virtual button 514, second virtual button 516, and third virtual button 518, and/or color to include in subscription user interface 510 (e.g., directly or via the daemon). In some examples, the framework configures each of first virtual button 514, second virtual button 516, and third virtual button 518 to, when selected, initiate a process to purchase a corresponding subscription. In such examples, the framework can manage the process and, in some examples, not notify the application of selection of a virtual button and/or one or more steps occurring in the process to purchase the corresponding subscription. In some examples, the framework notifies the application that a subscription was successfully purchased after the process to purchase the subscription is completed. In some examples, the framework configures sign-in user-interface element 520 to, when selected, initiate a process to sign into the application that is managed by the framework instead of the application.

Figure 5C:
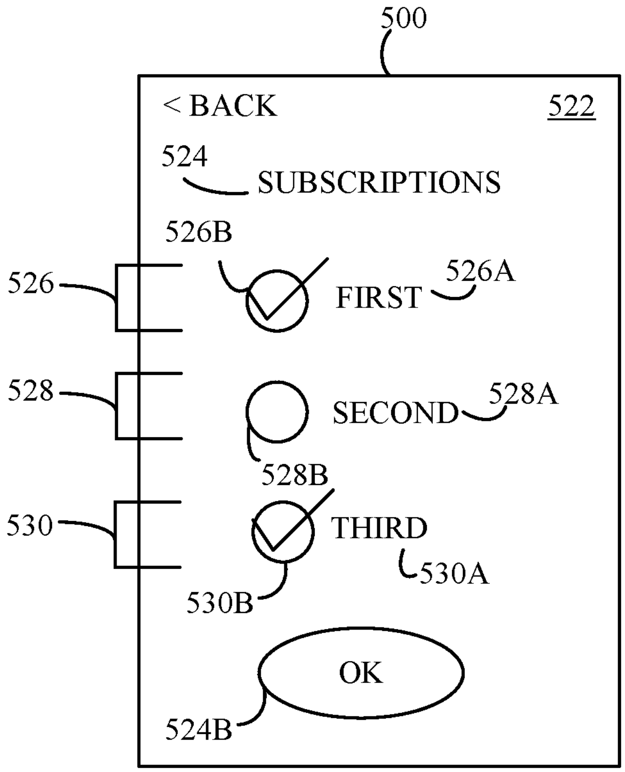

FIG. 5C is a block diagram illustrating a subscriptions user interface (e.g., subscriptions user interface 522) with checkboxes (e.g., first checkbox 526B, second checkbox 528B, and third checkbox 530B) displayed via an electronic device (e.g., electronic device 500). Similar to FIGS. 5A-5B, in some examples, subscriptions user interface 522 is displayed in response to electronic device 500 detecting input directed to a user-interface element displayed in a user interface of an application (e.g., the user interface was rendered and/or displayed by the application). In such examples, subscriptions user interface 522 can be caused to be displayed by the framework described with respect to FIGS. 5A-5B.

In some examples, the framework causes subscriptions user interface 522 to be displayed in response to receiving a declarative request by the application that includes an identification of a set of subscriptions (e.g., the set of subscriptions corresponding to each of first subscription 526, second subscription 528, and third subscription 530). In such examples, the declarative request might not identify each subscription and/or particular details (e.g., or, in some examples, any or most details) about first subscription 526, second subscription 528, and third subscription 530 but instead the framework (1) obtains an identification of each subscription from the daemon described with respect to FIGS. 5A-5B, (2) identifies which subscriptions that the user already has (e.g., first subscription 526 and third subscription 530, which are already check marked in the illustrated example of FIG. 3) from the daemon, and/or (3) determines what text, font, font size, size, shape, and/or relative orientation of first subscription 526, second subscription 528, third subscription 530, and ok button 524B, and/or color to include in subscriptions user interface 522 (e.g., directly or via the daemon). In some examples, the framework configures each of first checkbox 526B, second checkbox 528B, and third checkbox 530B to, when selected, change state to either checked or not checked. In some examples, the framework configures ok button 524B to, when selected, initiate a process to purchase a new subscription selected and/or terminate a subscription that was previously selected. In such examples, the framework can manage the process and, in some examples, not notify the application of selection of ok button 524B and/or one or more steps occurring in the process to purchase a new subscription selected and/or terminate a subscription that was previously selected. In some examples, the framework notifies the application that a subscription was successfully purchased and/or terminated after the process is completed. It should be noted that subscriptions user interface 522 does not include a user-interface element to sign in. In some examples, the framework determined that the user is already signed in and does not need to render the user-interface element to sign in with subscriptions user interface 522.

Figure 5D:
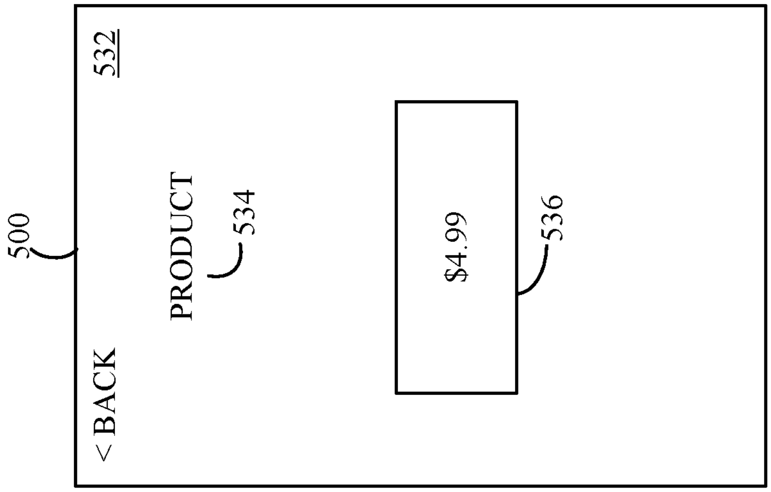

FIG. 5D is a block diagram illustrating a product user interface (e.g., product user interface 532) displayed via an electronic device (e.g., electronic device 500). Similar to FIGS. 5A-5C, in some examples, product user interface 532 is displayed in response to electronic device 500 detecting input directed to a user-interface element displayed in a user interface of an application (e.g., the user interface was rendered and/or displayed by the application). In such examples, product user interface 532 can be caused to be displayed by the framework described with respect to FIGS. 5A-5C.

In some examples, the framework causes product user interface 532 to be displayed in response to receiving a declarative request by the application that includes an identification of a product (e.g., the product corresponding to the product listed by product text 534). In such examples, the declarative request might not identify particular details (e.g., or, in some examples, any or most details) about virtual button 536 but instead the framework (1) obtains a price (e.g., $4.99) from the daemon described with respect to FIGS. 5A-5C and/or (2) determines what text, font, font size, size and/or shape of virtual button 536, and/or color to include in product user interface 532 (e.g., directly or via the daemon). Similar to FIG. 5C, it should be noted that product user interface 532 does not include a user-interface element to sign in. In some examples, the framework determined that the user is already signed in and does not need to render the user-interface element to sign in with product user interface 532.

Figure 5E:
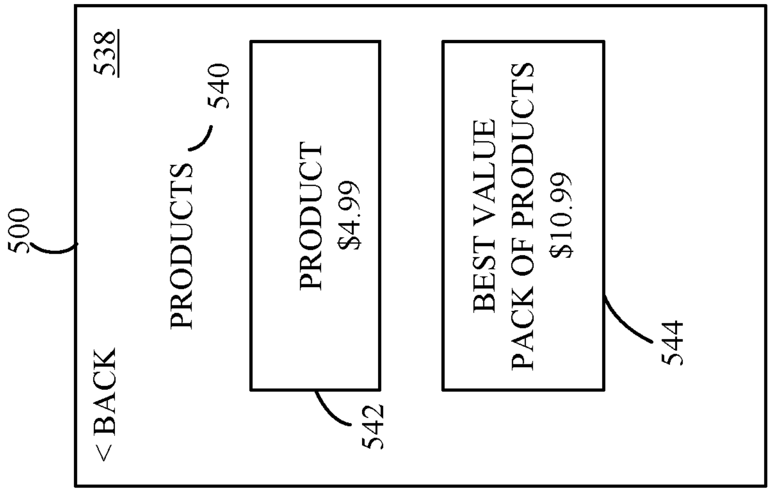

FIG. 5E is a block diagram illustrating a products user interface (e.g., products user interface 538) displayed via an electronic device (e.g., electronic device 500). Similar to FIGS. 5A-5D, in some examples, products user interface 538 is displayed in response to electronic device 500 detecting input directed to a user-interface element displayed in a user interface of an application (e.g., the user interface was rendered and/or displayed by the application). In such examples, products user interface 538 can be caused to be displayed by the framework described with respect to FIGS. 5A-5D.

In some examples, the framework causes products user interface 538 to be displayed in response to receiving a declarative request by the application that includes an identification of a set of products (e.g., the set of products corresponding to each of first virtual button 542 and second virtual button 544). In such examples, the declarative request might not identify each product and/or particular details (e.g., or, in some examples, any or most details) about first virtual button 542 and second virtual button 544 but instead the framework (1) obtains an identification of each product from the daemon described with respect to FIGS. 5A-5D, (2) obtains a price (e.g., $4.99) for each product from the daemon, and/or (3) determines what text, font, font size, size, shape, and/or relative orientation of first virtual button 542 and second virtual button 544, and/or color to include in products user interface 538 (e.g., directly or via the daemon). Similar to FIGS. 5C-5D, it should be noted that products user interface 538 does not include a user-interface element to sign in. In some examples, the framework determined that the user is already signed in and does not need to render the user-interface element to sign in with products user interface 538.

Figure 6:
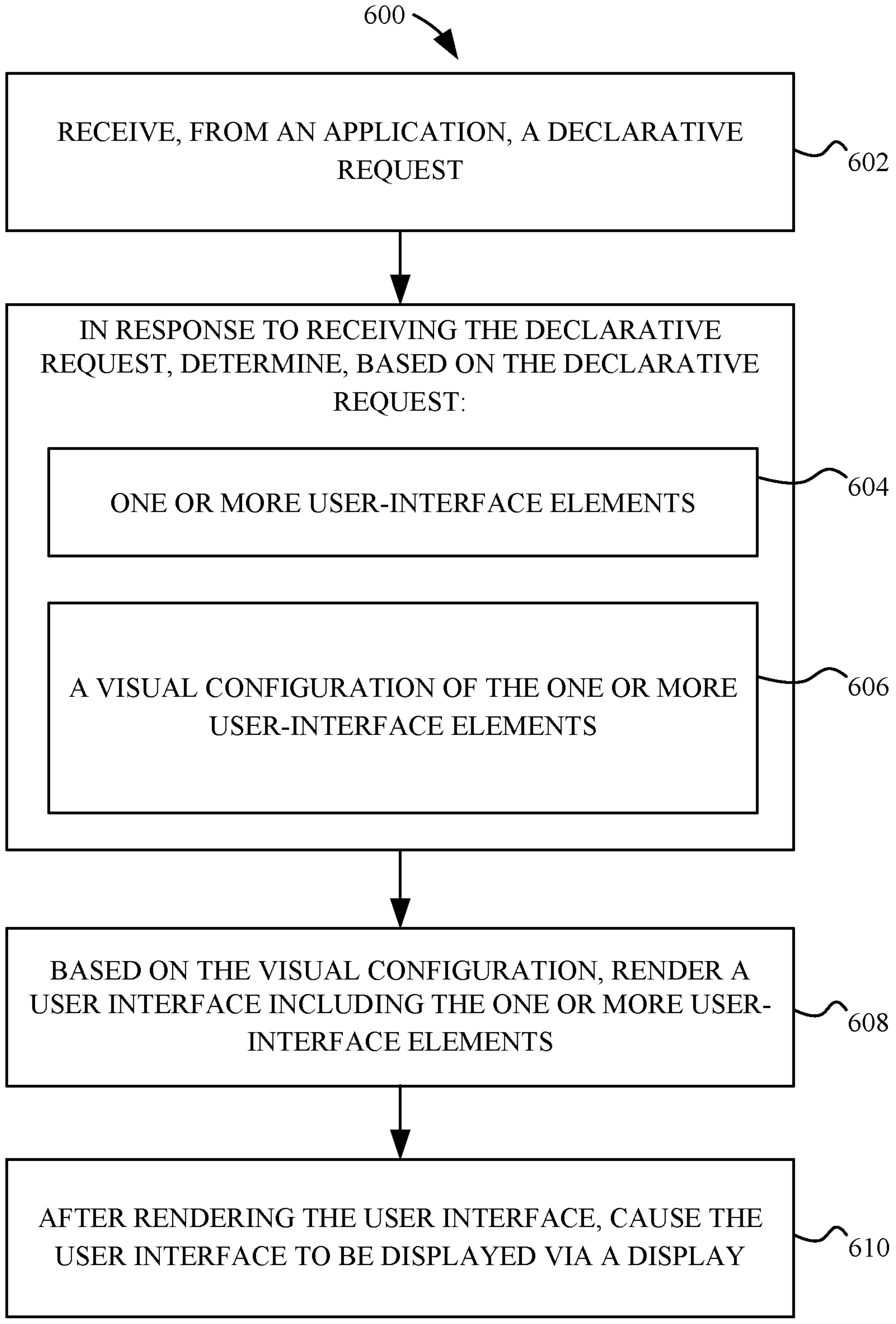
FIG. 6 is a flow diagram illustrating a method for causing a user interface to be displayed in accordance with some examples.

FIG. 6 is a flow diagram illustrating a method (e.g., method 600) for causing a user interface to be displayed in accordance with some examples. Some operations in method 600 are, optionally, combined, the orders of some operations are, optionally, changed, and some operations are, optionally, omitted.

As described below, method 600 provides an intuitive way for causing a user interface to be displayed. Method 600 reduces the cognitive burden on a user (e.g., a developer) for creating a user interface, thereby creating a more efficient human-machine interface. For battery-operated computing devices, enabling a user (e.g., a developer) to create a user interface faster and more efficiently conserves power and increases the time between battery charges.

In some examples, method 600 is performed by a framework (e.g., 330) (e.g., code and/or one or more instructions configured to perform one or more operations) (e.g., a software, user-interface, and/or front-end framework) executing in a process (e.g., 310) (e.g., a user process) of an application (e.g., 320) (e.g., a user application, a third-party application, such as a shopping application, a media application, and/or a gaming application) on an electronic device (e.g., 300, 500, 200, and/or 100), wherein the electronic device includes a display (and/or, in some examples, a display generation component, such as a projector and/or a display screen). In some examples, the electronic device is a personal device, a user device, a smart phone, a smart watch, a wearable device, a head-mounted display, a laptop, a desktop, and/or a tablet. In some examples, the framework executes and/or includes code separate from the application. In some examples, the framework is not included in the application. In some examples, the application downloads (e.g., from a process of an operating system of the electronic device) (e.g., from another process of the electronic device that is different from the process) the framework after the application initiates execution. In some examples, the application includes one or more calls (e.g., an application programming interface (API) call) to request and/or download the framework (e.g., from a process of an operating system of the electronic device) (e.g., from another process of the electronic device that is different from the process).

At 602, the framework, receives, from the application, a declarative request (e.g., 410). In some examples, the declarative request corresponds to an in-app purchase, such as a request to display a respective user interface for in-app purchases of one or more products and/or one or more subscriptions. In some examples, the declarative request includes data and/or information used by the framework to identify how to render and/or display a respective user interface. In some examples, the declarative request does not include a visual configuration for a respective user interface. In some examples, the declarative request includes an indication of what to include in a respective user interface but not how the respective user interface should look. In some examples, the declarative request indicates what needs to be done and not how to do it. In some examples, the declarative request includes what elements to include in a respective user interface and, in some examples, some degree of how the elements should look but not at least some detail with respect to the exact position and/or visual style of the elements in the respective user interface. In some examples, the declarative request does not include a list of one or more operations to be performed to render a respective user interface.

At 604, in response to receiving the declarative request, the framework, determines, based on the declarative request, one or more user-interface elements (e.g., 504, 506, 508, a portion of a background of 502, 512, 514, 516, 518, 520, a portion of a background of 510, 524, 526A, 526B, 528A, 528B, 530A, 530B, a portion of a background of 522, 534, 536, a portion of a background of 532, 540, 542, 544, and/or a portion of a background of 538) (e.g., a virtual button, indication, representation, background, text, image, and/or slider).

At 606, in response to receiving the declarative request, the framework, determines, based on the declarative request, a visual configuration (e.g., a background, size, relative position and/or orientation, and/or type of input mechanism) of the one or more user-interface elements. In some examples, the visual configuration is not defined (e.g., an explicit definition is not included) in the declarative request. In some examples, the declarative request includes an implicit definition (e.g., not an explicitly definition) of (e.g., an indication that is used to determine and/or, in some examples, a definition different from) the visual configuration.

At 608, based on the visual configuration (and/or in response to receiving the declarative request and/or determining, based on the declarative request, the one or more user-interface elements and/or the visual configuration) (and/or after receiving the declarative request) (and/or after determining, based on the declarative request, the one or more user-interface elements and/or the visual configuration), the framework renders (e.g., converts to a representation, such as a HTML representation) a user interface (e.g., a store view, a product view, and/or a subscription view) including the one or more user-interface elements (e.g., one or more operations to render the user interface are not included and/or defined in the declarative request and/or the application).

At 610, after (e.g., in response to, in conjunction with, and/or at some time after) rendering the user interface, the framework causes the user interface to be displayed via the display (e.g., on behalf of the application) (e.g., 420). In some examples, the user interface is displayed within a respective user interface of the application. In some examples, the user interface is displayed outside of a respective user interface of the application (e.g., is not contained within and/or is not overlaid on the respective user interface of the application). In some examples, the user interface is displayed in a system (e.g., an operating system) user interface of the computer system.

In some examples, while the user interface is displayed via the display, the framework detects an input (e.g., 422) (e.g., a tap input and/or a non-tap input, such as a swipe, air, hold-and-move, and/or gaze input) directed to a user-interface element of the user interface (e.g., the user interface includes the user-interface element and, in some examples, one or more other user-interface elements). In some examples, the framework detects the input directed to the user-interface element via a system process (e.g., a daemon and/or other type of system process). In some examples, detecting the input directed to the user-interface element of the user interface includes receiving an indication of the input and/or the user-interface element. In some examples, the indication of the input and/or the user-interface element is received from the application and/or the system process. In some examples, the framework detects the input directed to the user-interface element and other software executing in the process does not detect the input directed to the user-interface element. In some examples, the framework detects the input directed to the user-interface element and other software corresponding to the application does not detect the input directed to the user-interface element. In some examples, the framework detects the input directed to the user-interface element and the application does not detect the input directed to the user-interface element. In some examples, in response to detecting the input directed to the user-interface element of the user interface, the framework performs an operation (e.g., 424) (e.g., causing display of a different user interface, a different user-interface element, communicating with a different component (e.g., executing on the electronic device or on another device different from the electronic device)) corresponding to the input. In some examples, after (and/or in response to and/or while) detecting the input directed to the user-interface element of the user inter, the framework sends, to the application, a message (e.g., an acknowledgement, a communication, and/or a signal) corresponding to the input (e.g., 426) (e.g., sending the message is different and/or separate from performing the operation). In some examples, the message includes an indication of the input, the user-interface element, and/or the user interface. In some examples, the message includes an indication of a result of the input and/or an operation performed corresponding to the input, the user-interface element, and/or the user interface.

In some examples, performing the operation includes sending (e.g., communicating and/or transmitting) a request to a server (e.g., that is separate and/or different from the electronic device) in communication with the electronic device. In some examples, the message includes an indication of a result of sending the request to the server. In some examples, the indication is whether the request was successfully sent. In some examples, the indication is whether a response was received from the server. In some examples, the indication includes data received from the server. In some examples, the framework is downloaded by the application (e.g., as a dynamic link library) from an operating system of the electronic device.

In some examples, the declarative request includes an identification of one or more objects (e.g., products and/or subscriptions) (e.g., managed by, corresponding to, and/or associated with the application). In some examples, the one or more user-interface elements correspond to the one or more objects (e.g., a first user-interface element of the one or more user-interface elements corresponds to a first object of the one or more objects and a second user-interface element (e.g., different from the first user-interface object) of the one or more user-interface elements corresponds to a second object (e.g., different from the first object) of the one or more objects). In some examples, the declarative request includes an identification of a first object and a second object different from the first object. In some examples, the first object corresponds to a first user-interface element of the one or more user-interface elements. In some examples, the second object corresponds to a second user-interface element (e.g., different from the first user-interface element) of the one or more user-interface elements.

In some examples, rendering the user interface including the one or more user-interface elements includes, in accordance with a determination that a first object of the one or more objects is a first object type (e.g., a product and/or a subscription), rendering a user-interface element (e.g., of the one or more user-interface elements) (e.g., in the user interface) of a first user-interface type (e.g., a button and/or a check box). In some examples, rendering the user interface including the one or more user-interface elements includes, in accordance with a determination that the first object of the one or more objects is a second object type different from the first object type, rendering a user-interface element (e.g., of the one or more user-interface elements) (e.g., in the user interface) of a second user-interface type different from the first user-interface type.

In some examples, the declarative request includes a size (e.g., small, medium, or large), an order (e.g., a first position, a second position different from the first position, an initial position, and/or a terminal position in a list), an identification of (e.g., a location, an address, and/or other identifying information to obtain and/or download) a first icon (e.g., 504, 506, 508, a portion of a background of 502, 512, 514, 516, 518, 520, a portion of a background of 510, 524, 526A, 526B, 528A, 528B, 530A, 530B, a portion of a background of 522, 534, 536, a portion of a background of 532, 540, 542, 544, and/or a portion of a background of 538) (e.g., a graphical image and/or representation to be included in a respective user interface (e.g., the user interface or a generic user interface)), a description (e.g., one or more characters and/or strings), a background (e.g., one or more images and/or a video), and/or a portion (e.g., top, middle bottom, a top 10%, and/or a top region) of a respective user interface (e.g., the user interface or a generic user interface) to include a background, or any combination thereof corresponding to an object of the one or more objects.

In some examples, the declarative request includes the identification of the first icon. In some examples, after receiving the declarative request and before rendering the user interface including the one or more user-interface elements, the framework sends, to a first daemon (e.g., 340) (e.g., a system process) (e.g., of the computer system) executing outside of the process on the computer system (e.g., executing on the computer system), a request for the first icon using the identification of the first icon (e.g., 412). In some examples, the request includes the identification of the first icon. In some examples, the request is sent to the identification of the first icon. In some examples, the daemon retrieves and/or obtains (e.g., 414 and/or 416) the first icon from a server (e.g., 406, 350) (e.g., separate and/or different from the electronic device) in communication with the electronic device.

In some examples, the declarative request includes a representation of a second icon (e.g., 504, 506, 508, a portion of a background of 502, 512, 514, 516, 518, 520, a portion of a background of 510, 524, 526A, 526B, 528A, 528B, 530A, 530B, a portion of a background of 522, 534, 536, a portion of a background of 532, 540, 542, 544, and/or a portion of a background of 538) (e.g., includes the second icon). In some examples, the representation of the second icon is included in the user interface. In some examples, the user interface includes the second icon. In some examples, rendering the user interface includes adding the representation of the second icon to the user interface. In some examples, rendering the user interface includes adding the second icon (e.g., different from the representation of the second icon) to the user interface In some examples, the second icon corresponds to a user-interface element of the one or more user-interface elements. In some examples, the second icon corresponds to an object of the one or more objects.

In some examples, after receiving the declarative request and before rendering the user interface including the one or more user-interface elements, the framework sends, to a second daemon (e.g., 406 and/or 350) (e.g., a system process) (e.g., of the computer system) executing outside of the process on the computer system (e.g., executing on the computer system), a request for information (e.g., 412) (e.g., a price of a product or a tier of a subscription). In some examples, after sending the request for information, the framework receives, from the second daemon, the information (e.g., 418). In some examples, in response to receiving the request for information, the second daemon sends, to a server (e.g., 406 and/or 350), a request for the information (e.g., 414). In some examples, after sending the request for the information, the second daemon receives, from the server, the information (e.g., 416) and sends the information to the framework (e.g., 418). In some examples, the second daemon caches at least a portion of the information and does not send a request for the portion of the information in response to receiving the request for information.

In some examples, rendering the user interface including the one or more user-interface elements includes, in accordance with a determination that the declarative request corresponds to a single object (e.g., and/or not a plurality of objects), rendering a user-interface element (e.g., in the user interface) of a third user-interface type. In some examples, rendering the user interface including the one or more user-interface elements includes, in accordance with a determination that the declarative request corresponds to a plurality of objects (e.g., and/or not a single object), rendering a user-interface element (e.g., in the user interface) of a fourth user-interface type different from the third user-interface type.

In some examples, the user interface includes a respective user-interface element (e.g., a virtual button, a control, an indication, a representation, a checkbox, and/or a background) with, in accordance with a determination that the declarative request (e.g., with respect to the respective user-interface element) satisfies a first set of one or more criteria with respect to one or more characteristics (e.g., a form factor of the display and/or a capability of the electronic device (e.g., a type of display, speaker, and/or input mechanism)) of the electronic device, a first visual appearance (e.g., size, color, order, and/or shape). In some examples, the declarative request includes an indication and/or a definition of the respective user-interface element. In some examples, the definition of the respective user-interface element includes a size and/or input mechanism to be used for the respective user-interface element. In some examples, the first set of one or more criteria includes a criterion that is satisfied when one or more visual characteristics of the respective user-interface element (e.g., as defined in the declarative request) satisfies one or more visual requirements of the electronic device. In some examples, the declarative request includes an indication of a size of the respective user-interface element. In some examples, the first set of one or more criteria includes a criterion that is satisfied when a size of a user-interface element meets a threshold (e.g., is below or above the threshold). In some examples, the criterion of the first set of one or more criteria is satisfied when a size of a user-interface element is smaller than a particular number of pixels. In some examples, the size of the respective user-interface element is below the particular number of pixels when the declarative request satisfies the first set of one or more criteria with respect to the one or more characteristics of the electronic device. In some examples, the first set of one or more criteria requires that a user-interface element is smaller than a predefined "large" size to fit the display of the electronic device (e.g., a wearable device). In some examples, the declarative request includes an indication that the respective user-interface element is a predefined "medium" size and accordingly satisfies the first set of one or more criteria. In some examples, the user interface includes a respective user-interface element with, in accordance with a determination that the declarative request includes a requirement that does not satisfy the first set of one or more criteria with respect to the one or more characteristics of the electronic device, a second visual appearance different from the first visual appearance. In some examples, functionality of the respective user-interface is the same with the first visual appearance and the second visual appearance. In some examples, the second visual appearance overrides the requirement of the declarative request. In some examples, the framework overrides the requirement of the declarative request when the requirement does not satisfy the first set of one or more criteria with respect to the one or more characteristics of the electronic device.

The foregoing description, for purpose of explanation, has been described with reference to specific examples. However, the illustrative discussions above are not intended to be exhaustive or to limit the disclosure to the precise forms disclosed. Many modifications and variations are possible in view of the above teachings. The examples were chosen and described in order to best explain the principles of the techniques and their practical applications. Others skilled in the art are thereby enabled to best utilize the techniques and various examples with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve creating a user interface. The present disclosure contemplates that in some instances, this gathered data can include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to change how a device interacts with a user. Accordingly, use of such personal information data enables better user interactions. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of image capture, the present technology can be configured to allow users to select to "opt in" or "opt out" of participation in the collection of personal information data during registration for services.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, content can be displayed to users by inferring user-interface elements based on non-personal information data or a bare minimum amount of personal information, such as the content being requested by the device associated with a user or other non-personal information.

What is claimed is:

1. A method, comprising:

by a framework executing in a process of an application on an electronic device, wherein the electronic device includes a display, wherein the framework is separate from the application:
  receiving, from the application, a declarative request;
  in response to receiving the declarative request, determining, based on the declarative request:
    one or more user-interface elements; and
    a visual configuration of the one or more user-interface elements, wherein the visual configuration is not defined in the declarative request;
  based on the visual configuration, rendering a user interface including the one or more user-interface elements; and
  after rendering the user interface, causing the user interface to be displayed via the display.

2. The method of claim 1, further comprising:

while the user interface is displayed via the display, detecting an input directed to a user-interface element of the user interface;

in response to detecting the input directed to the user-interface element of the user interface, performing an operation corresponding to the input; and after detecting the input directed to the user-interface element of the user interface, sending, to the application, a message corresponding to the input.

3. The method of claim 2, wherein performing the operation includes sending, to a server in communication with the electronic device, a request, and wherein the message includes an indication of a result of sending the request to the server.

4. The method of claim 1, wherein the framework is downloaded by the application from an operating system of the electronic device.

5. The method of claim 1, wherein the declarative request includes an identification of one or more objects, and wherein the one or more user-interface elements correspond to the one or more objects.

6. The method of claim 5, wherein rendering the user interface including the one or more user-interface elements includes:

in accordance with a determination that a first object of the one or more objects is a first object type, rendering a user-interface element of a first user-interface type; and in accordance with a determination that the first object of the one or more objects is a second object type different from the first object type, rendering a user-interface element of a second user-interface type different from the first user-interface type.

7. The method of claim 5, wherein the declarative request includes a size, an order, an identification of a first icon, a description, a background, and/or a portion of a respective user interface to include a background, or any combination thereof corresponding to an object of the one or more objects.

8. The method of claim 7, wherein the declarative request includes the identification of the first icon, the method further comprising:

after receiving the declarative request and before rendering the user interface including the one or more user-interface elements, sending, to a first daemon executing outside of the process on the electronic device, a request for the first icon using the identification of the first icon.

9. The method of claim 5, wherein the declarative request includes a representation of a second icon.

10. The method of claim 5, further comprising:

after receiving the declarative request and before rendering the user interface including the one or more user-interface elements, sending, to a second daemon executing outside of the process on the electronic device, a request for information.

11. The method of claim 1, wherein rendering the user interface including the one or more user-interface elements includes:

in accordance with a determination that the declarative request corresponds to a single object, rendering a user-interface element of a third user-interface type; and in accordance with a determination that the declarative request corresponds to a plurality of objects, rendering a user-interface element of a fourth user-interface type different from the third user-interface type.

12. The method of claim 1, wherein the user interface includes a respective user-interface element with:

in accordance with a determination that the declarative request satisfies a first set of one or more criteria with respect to one or more characteristics of the electronic device, a first visual appearance; and in accordance with a determination that the declarative request includes a requirement that does not satisfy the first set of one or more criteria with respect to the one or more characteristics of the electronic device, a second visual appearance different from the first visual appearance.

13. A non-transitory computer-readable storage medium storing one or more programs configured to be executed by one or more processors of an electronic device, the one or more programs including instructions, to be executed by a framework executing in a process of an application on the electronic device, for:

receiving, from the application, a declarative request, wherein the framework is separate from the application;

in response to receiving the declarative request, determining, based on the declarative request:

one or more user-interface elements; and a visual configuration of the one or more user-interface elements, wherein the visual configuration is not defined in the declarative request;

based on the visual configuration, rendering a user interface including the one or more user-interface elements; and after rendering the user interface, causing the user interface to be displayed via a display of the electronic device.

14. The non-transitory computer-readable storage medium of claim 13, wherein the instructions, when executed by the one or more processors, further cause the electronic device to:

while the user interface is displayed via the display, detect an input directed to a user-interface element of the user interface;

in response to detecting the input directed to the user-interface element of the user interface, perform an operation corresponding to the input; and after detecting the input directed to the user-interface element of the user interface, send, to the application, a message corresponding to the input.

15. The non-transitory computer-readable storage medium of claim 14, wherein performing the operation includes sending, to a server in communication with the electronic device, a request, and wherein the message includes an indication of a result of sending the request to the server.

16. The non-transitory computer-readable storage medium of claim 13, wherein the framework is downloaded by the application from an operating system of the electronic device.

17. The non-transitory computer-readable storage medium of claim 13, wherein the declarative request includes an identification of one or more objects, and wherein the one or more user-interface elements correspond to the one or more objects.

18. The non-transitory computer-readable storage medium of claim 17, wherein rendering the user interface including the one or more user-interface elements includes:

in accordance with a determination that a first object of the one or more objects is a first object type, rendering a user-interface element of a first user-interface type; and in accordance with a determination that the first object of the one or more objects is a second object type different from the first object type, rendering a user-interface element of a second user-interface type different from the first user-interface type.

19. The non-transitory computer-readable storage medium of claim 17, wherein the declarative request includes a size, an order, an identification of a first icon, a description, a background, and/or a portion of a respective user interface to include a background, or any combination thereof corresponding to an object of the one or more objects.

20. The non-transitory computer-readable storage medium of claim 19, wherein the declarative request includes the identification of the first icon, wherein the instructions, when executed by the one or more processors, further cause the electronic device to:

after receiving the declarative request and before rendering the user interface including the one or more user-interface elements, send, to a first daemon executing outside of the process on the electronic device, a request for the first icon using the identification of the first icon.

21. The non-transitory computer-readable storage medium of claim 17, wherein the declarative request includes a representation of a second icon.

22. The non-transitory computer-readable storage medium of claim 17, wherein the instructions, when executed by the one or more processors, further cause the electronic device to:

after receiving the declarative request and before rendering the user interface including the one or more user-interface elements, send, to a second daemon executing outside of the process on the electronic device, a request for information.

23. The non-transitory computer-readable storage medium of claim 13, wherein the instructions, when executed by the one or more processors, further cause the electronic device to:

in accordance with a determination that the declarative request corresponds to a single object, render a user-interface element of a third user-interface type; and in accordance with a determination that the declarative request corresponds to a plurality of objects, render a user-interface element of a fourth user-interface type different from the third user-interface type.

24. The non-transitory computer-readable storage medium of claim 13, wherein the user interface includes a respective user-interface element with:

in accordance with a determination that the declarative request satisfies a first set of one or more criteria with respect to one or more characteristics of the electronic device, a first visual appearance; and in accordance with a determination that the declarative request includes a requirement that does not satisfy the first set of one or more criteria with respect to the one or more characteristics of the electronic device, a second visual appearance different from the first visual appearance.

25. An electronic device, comprising:

a display;

one or more processors; and memory storing one or more programs configured to be executed by the one or more processors, the one or more programs including instructions, to be executed by a framework executing in a process of an application on the electronic device, for:

receiving, from an application of the one or more programs, a declarative request, wherein the framework is separate from the application;

in response to receiving the declarative request, determining, based on the declarative request:

one or more user-interface elements; and a visual configuration of the one or more user-interface elements, wherein the visual configuration is not defined in the declarative request;

based on the visual configuration, rendering a user interface including the one or more user-interface elements; and after rendering the user interface, causing the user interface to be displayed via the display.

26. The electronic device of claim 25, wherein the one or more programs further include instructions for:

while the user interface is displayed via the display, detecting an input directed to a user-interface element of the user interface;

in response to detecting the input directed to the user-interface element of the user interface, performing an operation corresponding to the input; and after detecting the input directed to the user-interface element of the user interface, sending, to the application, a message corresponding to the input.

27. The electronic device of claim 26, wherein performing the operation includes sending, to a server in communication with the electronic device, a request, and wherein the message includes an indication of a result of sending the request to the server.

28. The electronic device of claim 25, wherein the framework is downloaded by the application from an operating system of the electronic device.

29. The electronic device of claim 25, wherein the declarative request includes an identification of one or more objects, and wherein the one or more user-interface elements correspond to the one or more objects.

30. The electronic device of claim 29, wherein rendering the user interface including the one or more user-interface elements includes:

in accordance with a determination that a first object of the one or more objects is a first object type, rendering a user-interface element of a first user-interface type; and in accordance with a determination that the first object of the one or more objects is a second object type different from the first object type, rendering a user-interface element of a second user-interface type different from the first user-interface type.

31. The electronic device of claim 29, wherein the declarative request includes a size, an order, an identification of a first icon, a description, a background, and/or a portion of a respective user interface to include a background, or any combination thereof corresponding to an object of the one or more objects.

32. The electronic device of claim 31, wherein the declarative request includes the identification of the first icon, wherein the one or more programs further include instructions for:

after receiving the declarative request and before rendering the user interface including the one or more user-interface elements, sending, to a first daemon executing outside of the process on the electronic device, a request for the first icon using the identification of the first icon.

33. The electronic device of claim 29, wherein the declarative request includes a representation of a second icon.

34. The electronic device of claim 29, wherein the one or more programs further include instructions for:

after receiving the declarative request and before rendering the user interface including the one or more user-interface elements, sending, to a second daemon executing outside of the process on the electronic device, a request for information.

35. The electronic device of claim 25, wherein the one or more programs further include instructions for:

in accordance with a determination that the declarative request corresponds to a single object, rendering a user-interface element of a third user-interface type; and in accordance with a determination that the declarative request corresponds to a plurality of objects, rendering a user-interface element of a fourth user-interface type different from the third user-interface type.

36. The electronic device of claim 25, wherein the user interface includes a respective user-interface element with:

in accordance with a determination that the declarative request satisfies a first set of one or more criteria with respect to one or more characteristics of the electronic device, a first visual appearance; and in accordance with a determination that the declarative request includes a requirement that does not satisfy the first set of one or more criteria with respect to the one or more characteristics of the electronic device, a second visual appearance different from the first visual appearance.

* * * * *